(12) United States Patent
Huang (10) Patent No.: US 10,845,614 B2
(45) Date of Patent: Nov. 24, 2020

(54) NEAR-EYE DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 465 days.

(21) Appl. No.: 15/633,784

(22) Filed: Jun. 27, 2017

(65) Prior Publication Data
US 2018/0203243 A1    Jul. 19, 2018

(30) Foreign Application Priority Data

Jan. 19, 2017  (TW) .............................. 106101816 A (51) Int. Cl.
*G02B 30/24* (2020.01)
*G02B 27/28* (2006.01)
*G02B 27/01* (2006.01)

(52) U.S. Cl.
CPC ............ *G02B 30/24* (2020.01); *G02B 27/283* (2013.01); *G02B 2027/0134* (2013.01)

(58) Field of Classification Search
CPC ... G02B 27/2264; G02B 27/283; G02B 30/24
See application file for complete search history.

(56) References Cited

U.S. PATENT DOCUMENTS

| | | | |
|---|---|---|---|
| 5,035,474 A * | 7/1991 | Moss ...................... | G02B 27/01 359/13 |
| 6,795,042 B1 | 9/2004 | Nagata et al. | |
| 8,482,859 B2 | 7/2013 | Border et al. | |
| 9,829,716 B1 * | 11/2017 | Huang ................... | G02B 30/24 |
| 2004/0150884 A1 * | 8/2004 | Domjan ................ | G02B 30/34 359/462 |
| 2015/0085234 A1 * | 3/2015 | Hsu ................... | G02F 1/133553 349/114 |
| 2015/0301336 A1 | 10/2015 | Laster | |

(Continued)

FOREIGN PATENT DOCUMENTS

| CN | 1343319 A | 4/2002 |
|---|---|---|
| CN | 104903777 A | 9/2015 |
| JP | 6-59217 A | 3/1994 |

(Continued)

OTHER PUBLICATIONS

Douglas Lanman, David Luebke, "Near-eye light field displays", Proceedings of ACM SIGGRAPH, Asia 2013 Article No. 220, vol. 32 Issue 6, Nov. 2013.

(Continued)

*Primary Examiner* — Thanh Nhan P Nguyen
(74) *Attorney, Agent, or Firm* — CKC & Partners Co., LLC (57) ABSTRACT

A near-eye display device includes an image output module, a coded-aperture module, and a light-guiding component. The image output module is configured to provide at least one image. The coded-aperture module is configured to encode the lights of the at least one image emitted from the image output module, so as to generate at least one left-eye image and at least one right-eye image. The light-guiding component is configured to send the left-eye image and the right-eye image to different directions respectively.

10 Claims, 4 Drawing Sheets

(56) References Cited

U.S. PATENT DOCUMENTS

2016/0073100 A1* 3/2016 Huang .............. G02B 26/0833
353/7

FOREIGN PATENT DOCUMENTS

| JP | 2012-220776 | A | 11/2012 |
| TW | 200521559 | A | 7/2005 |
| TW | I376527 | B | 11/2012 |
| TW | I531215 | B | 4/2016 |

OTHER PUBLICATIONS

June-Jei Huang, "Near-Eye Display Device", Application No. 105111444, Filed on Apr. 13, 2016.
June-Jei Huang, "Near-Eye Display Device", U.S. Appl. No. 15/213,388, filed Jul. 18, 2016.

* cited by examiner

NEAR-EYE DISPLAY DEVICE

RELATED APPLICATIONS

This application claims priority to Taiwan Application Serial Number 106101816, filed Jan. 19, 2017, which is herein incorporated by reference.

BACKGROUND

Field of Invention

The present invention relates to near-eye display devices.

Description of Related Art

We are living in a colorful three-dimensional (3D) world. Conventional display technologies can provide no more than a two-dimensional image lacking in depth information. The two-dimensional display has greatly limited the amount of information that people may acquire from the colorful 3D world. Rapid growths in electronic technologies, optical technologies, and optoelectronic technologies facilitate the development of three-dimensional display technologies that feature depth information of objects, and satisfy the needs of acquiring information of modern people. As a result, the three-dimensional display technologies have drawn attention in both academia and business communities.

Near-eye light field display is one of the simplest methods realizing the three-dimensional display. The near-eye display introduces a concept of light field reconstruction. For any three-dimensional reconstructed point, at least two light rays enter the pupil of a human eye, such that the eye may focus freely depending on different depths of images, which makes the viewing experience more real and natural. The typical near-eye light field display adopts a spatial-multiplex method in which a light field effect is achieved by images of plural viewing angles through a lens array but the resolution of the images is reduced accordingly.

SUMMARY

In some embodiments of the present invention, a near-eye display device is provided. The display method of time-multiplex is worked with different coded reflective pattern, so as to code the image, and the light of image passing the coded pattern is overlapped due to the persistence of version, thereby achieving the light field effect. Herein, by providing image having the information of the left-eye image and the information of the right-eye image at the same time, and extracting the information of the left-eye image and the information of the right-eye image by the light-guiding component, the brightness of the image is prevented from being lowered due to the time-multiplex of left and right eyes.

According to some embodiments of the present invention, a near-eye display device includes an image output module, a coded-aperture module, and a light-guiding component. The image output module is configured to provide at least one image. The coded-aperture module is configured to encode light of the at least one image emitted from the image output module, so as to generate at least one left-eye image and at least one right-eye image. The light-guiding component is configured to send the left-eye image and the right-eye image to different directions respectively.

In some embodiments of the present invention, the light-guiding component is configured to send the left-eye image and the right-eye image to two opposite directions respectively.

In some embodiments of the present invention, the light-guiding component comprises at least one beam splitter.

In some embodiments of the present invention, the light-guiding component includes a first splitting interface and a second splitting interface. The first splitting interface is corresponding to a first portion of the coded-aperture module. The second splitting interface is corresponding to a second portion of the coded-aperture module, in which the first splitting interface is not parallel with the second splitting interface.

In some embodiments of the present invention, the image output module includes plural light-emitting diodes.

In some embodiments of the present invention, the coded-aperture module is a liquid crystal on silicon (LCOS).

According to some embodiments of the present invention, a near-eye display device includes at least one lens group and at least one polarizing beam splitter. The lens group is disposed in at least one exit path of the light-guiding component. The polarizing beam splitter is disposed in at least one exit path of the lens group.

In some embodiments of the present invention, the near-eye display device further includes at least one reflective mirror and at least one eyepiece group, in which the polarizing beam splitter is disposed between the reflective mirror and the eyepiece group.

In some embodiments of the present invention, the reflective mirror is a concave mirror.

In some embodiments of the present invention, two of the lens groups are disposed on two opposite sides of the light-guiding component.

In some embodiments of the present invention, the near-eye display device further includes a polarizer configured to transform the light of the image to polarized light, and send the polarized light to the coded-aperture module.

In some embodiments of the present invention, the light-guiding component includes a first beam splitter and a second beam splitter. The first beam splitter is structurally connected with the second beam splitter.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
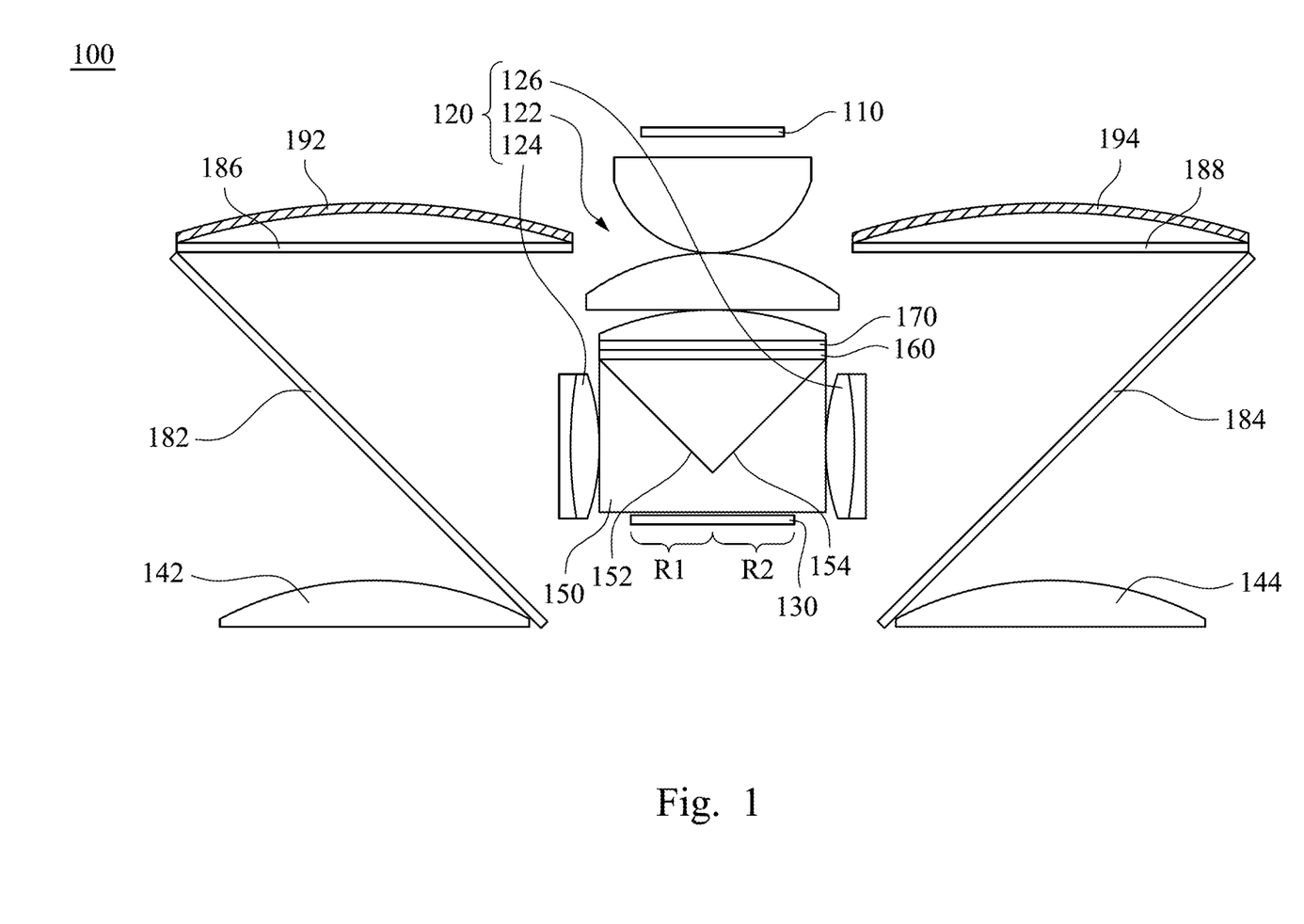
FIG. 1 is a top schematic view of a near-eye display device according to some embodiments of the present invention.
Figure 2:
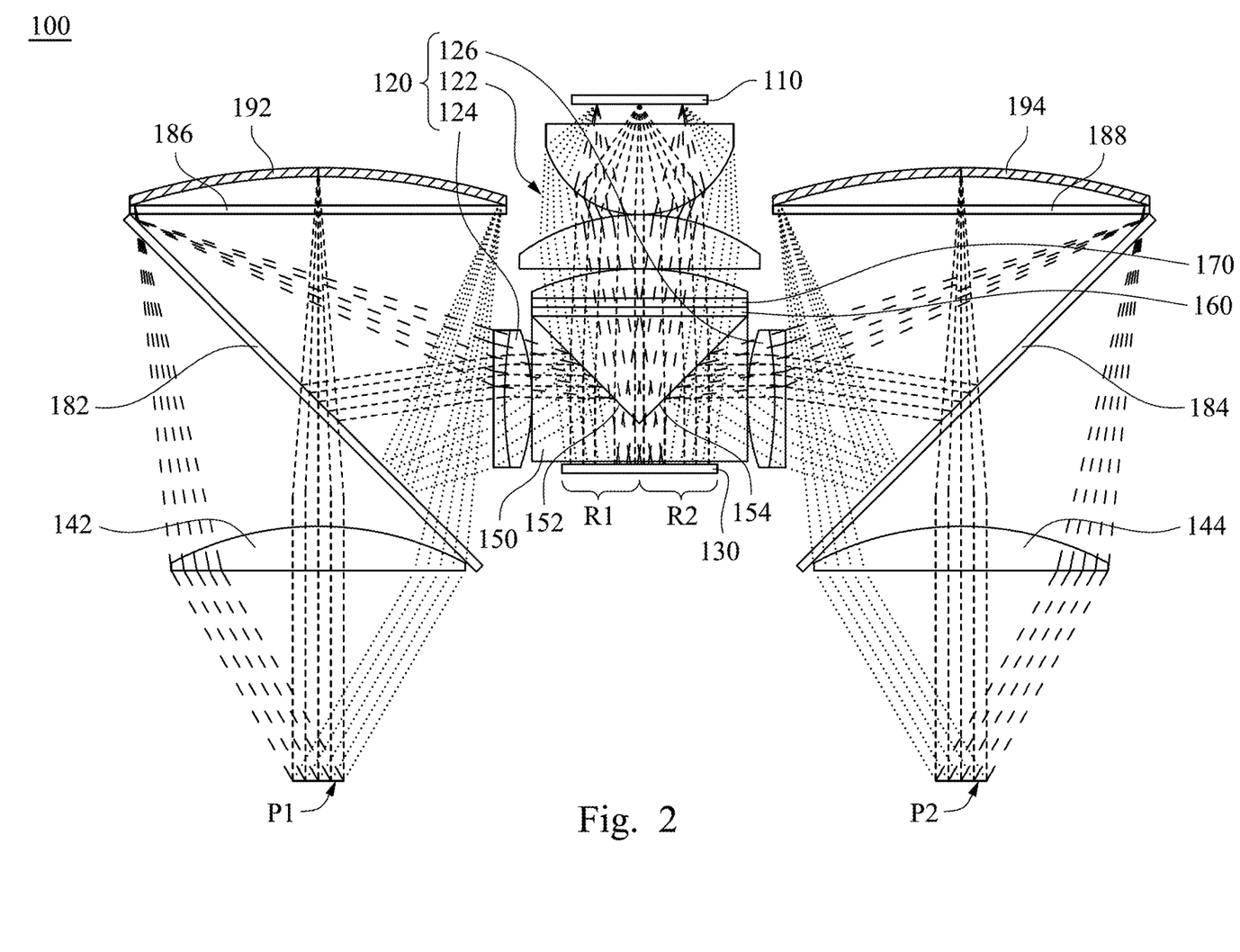
FIG. 2 is an optical schematic view of the near-eye display device of FIG. 1.

Reference will now be made in detail to the present embodiments of the invention, examples of which are illus- FIG. 1 is a top schematic view of a near-eye display device 100 according to some embodiments of the present invention. FIG. 2 is an optical schematic view of the near-eye display device 100 of FIG. 1. Reference is made to FIG. 1 and FIG. 2. The near-eye display device 100 includes an image output module 110, an object lens group 120, a coded-aperture module 130, a first eyepiece group 142, a second eyepiece group 144, and a light-guiding component 150. The image output module 110 is configured to provide at least one image. The object lens group 120 is configured to receive light of the image, in which the object lens group 120 includes a first lens group 122, a second lens group 124, and a third lens group 126. The coded-aperture module 130 is configured to encode light of the image transmitted from the first lens group 122 so as to generate a left-eye image and a right-eye image. The light-guiding component 150 is configured to send the left-eye image and the right-eye image to different directions respectively. For example, the light-guiding component 150 may send the left-eye image and the right-eye image to two opposite directions respectively.

Furthermore, the coded-aperture module 130 includes a first region R1 and a second region R2 adjoining the first region R1, the first region R1 may transform the light of the image received by itself into the left-eye image, and the second region R2 may transform the light of the image received by itself into the right-eye image. The light-guiding component 150 is configured to send the left-eye image to the second lens group 124 and the first eyepiece group 142, and the first eyepiece group 142 is configured to send the left-eye image to the first position P1. The light-guiding component 150 is configured to send the right-eye image to the third lens group 126 and the second eyepiece group 144, and the second eyepiece group 144 is configured to send the right-eye image to the second position P2.

In some embodiments of the present invention, the near-eye display device 100 further includes a polarizer 160 configured to transform the light of the image to polarized light, and send the polarized light to the coded-aperture module 130. In some embodiments, the polarizer 160 may be an absorbing polarizer. For example, the polarizer 160 may absorb s-polarized light and transmit p-polarized light. In some embodiments, the near-eye display device 100 further includes a quarter-wave plate 170, which receives the light of the image emitted from the image output module 110 and sends the light of the image to the polarizer 160. In the polarizing system, the configuration of the quarter-wave plate 170 may reduce some undesired light passing through the coded-aperture module 130. For example, after the polarizer 160 transmits p-polarized light, the p-polarized light is transformed into s-polarized light or keeps the original polarization state under the control of the coded-aperture module 130. In some embodiments, the s-polarized light passing through the coded-aperture module 130 may be reflected by the first splitting interface 152 or the second splitting interface 154 to the eyepieces, and arrive at pupils. The p-polarized light passing through the coded-aperture module 130 may go through the first splitting interface 152 or the second splitting interface 154, go back through the polarizer 160, be absorbed or reflected by the lens interface or the image output module 110, and again go back to the polarizer 160. Passing the quarter-wave plate 170 twice, the p-polarized light is transformed into s-polarized light, which is absorbed and filtered by the polarizer 160. Therefore, the quarter-wave plate 170 may lower the disturbance resulting form factors such as interfacial reflection. It is noted that, herein, the p-polarized light and the s-polarized light merely represents two linear polarized lights with orthogonal polarization states, and the exemplary configuration should not limit the design of the polarizer 160 and the coded-aperture module 130.

It should be noted that, in FIG. 2, since the optical paths (i.e., propagating directions of light) are complex, some of the optical paths are not depicted. For example, some optical paths showing light transmitted to the coded-aperture module 130 is reflected to the first splitting interface 152 and the second splitting interface 154 are not depicted. However, these does not influence one with ordinary skill in the art to understand the design rule of the present disclosure, and therefore the quality of the depicted optical paths (e.g., the completeness or accuracy) should not limit the scope of the present invention.

Figure 3:
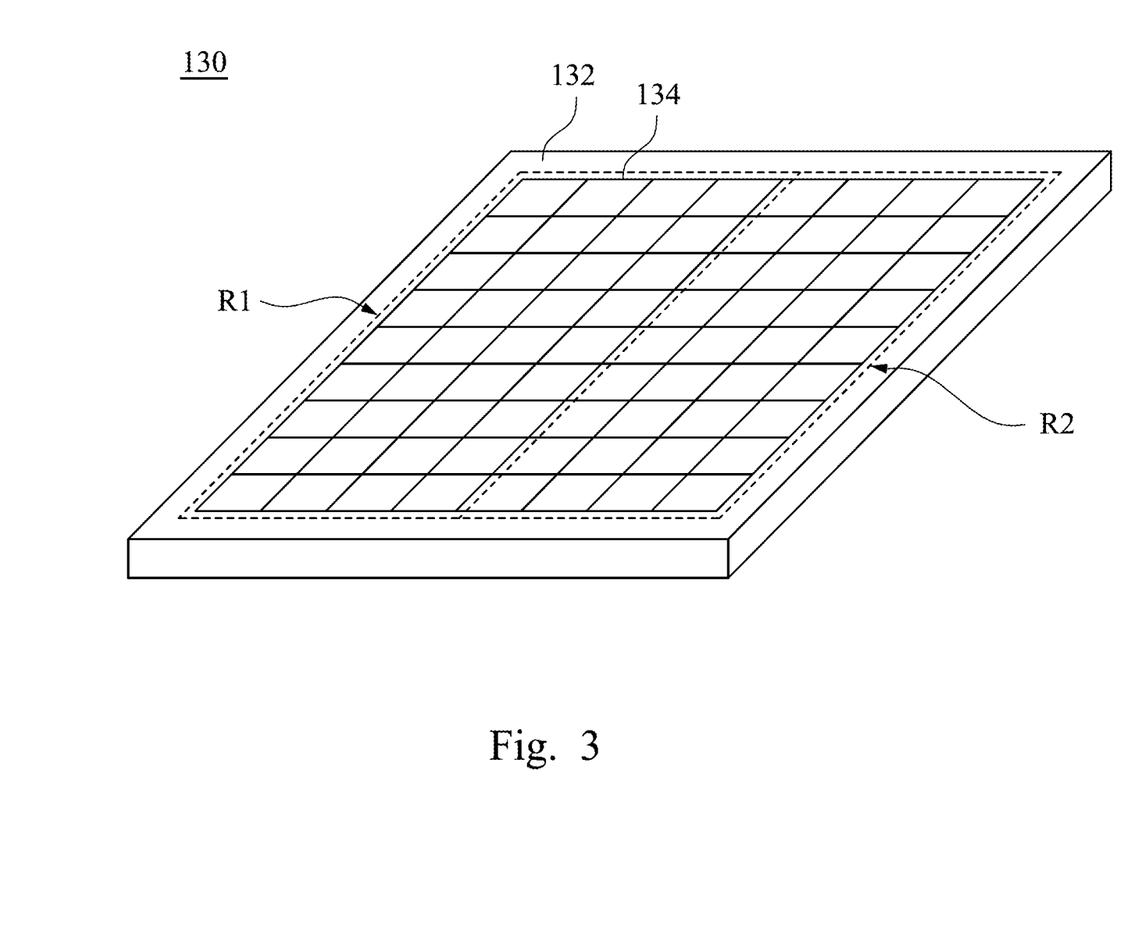
FIG. 3 is a stereo schematic view of part of elements of a near-eye display device according to some embodiments of the present invention.

FIG. 3 is a stereo schematic view of the coded-aperture module 130 of the near-eye display device 100 according to some embodiments of the present invention. Reference is made to FIG. 1 to FIG. 3. The coded-aperture module 130 may include a substrate 132 and plural pixels 134. The pixels 134 are configured to control the property of light, and therefore may encode the light of the image. In some embodiments of the present invention, the coded-aperture module 130 may be a liquid crystal on silicon (LCOS). In the LCOS, each pixel 134 includes an active device (not shown), a reflective layer (not shown), a liquid crystal layer (not shown), and a top electrode layer on the silicon substrate 132, and the liquid crystal layer is sandwiched between the reflective layer and the top electrode layer, in which an alignment direction of the liquid crystal layer is matched with the polarizing direction of the polarizer 160. Therefore, each pixel 134 is capable of determining whether to transform the polarization state of light. After light is reflected by the LCOS, the light with a transformed polarization state would be reflected by the light-guiding component 150, and the light with an unchanged polarization state would pass through the light-guiding component 150, and not be reflected to the second lens group 124 or the third lens group 126.

In the embodiments of the present invention, the light-guiding component 150 includes the first splitting interface 152 and the second splitting interface 154. The first splitting interface 152 and the second splitting interface 154 are polarization splitting interfaces. Herein, the first splitting interface 152 and the second splitting interface 154 have the same polarization splitting property. The polarization splitting properties of the first splitting interface 152 and the second splitting interface 154 may be arrange in accordance with the polarizer 160, so that the first splitting interface 152 and the second splitting interface 154 transmit the light coming from the polarizer 160. For example, the first splitting interface 152 and the second splitting interface 154 may reflect s-polarized light and transmit p-polarized light. Alternatively, the first splitting interface 152 and the second splitting interface 154 may reflect p-polarized light and transmit s-polarized light, in which the polarizer 160 is configured to transmit s-polarized light.

In some embodiments, the configuration of the first splitting interface 152 and the second splitting interface 154 defines the first region R1 and the second region R2 of the coded-aperture module 130. To be specific, the first splitting interface 152 is configured to transmit a first portion of the light of the image coming from the first lens group 122, so that the first portion of the light of the image arrive at the first region R1, and after the first region R1 reflects the first portion of the light of the image, the first splitting interface 152 is configured to reflect the first portion of the light of the image coming from the first region R1 to the second lens group 124. The second splitting interface 154 is configured to transmit a second portion of the light of the image coming from the first lens group 122, so that the second portion of the light of the image arrive at the second region R2, and after the second region R2 reflects the second portion of the light of the image, the second splitting interface 154 is configured to reflect the second portion of the light of the image coming from the second region R2 to the third lens group 126. Herein, the light of the image is roughly divided into the first portion and the second portion by the first region R1 and the second region R2 of the coded-aperture module 130.

In the present embodiments, the first splitting interface 152 and the second splitting interface 154 may be connected. Connected edges of the first splitting interface 152 and the second splitting interface 154 may be a straight line, so that connected edges of the first region R1 and the second region R2 may be a straight line, as shown in FIG. 3. In other embodiments, the connected edges of the first splitting interface 152 and the second splitting interface 154 may not be straight line but curved lines (not shown). For example, it may be periodic sawtooth or sinusoid waveform (not shown), and the connected edges of the first region R1 and the second region R2 may have similar shapes. In some embodiments, the first splitting interface 152 and the second splitting interface 154 may be disconnected from each other, and the first region R1 and the second region R2 are disconnected from each other.

Herein, the first region R1 and the second region R2 are disposed on the same coded-aperture module 130 (e.g., LCOS). In other embodiments, the first region R1 and the second region R2 may be disposed on two different coded-aperture modules 130 (e.g., two LCOSs) respectively, and therefore the first region R1 and the second region R2 are not structurally connected. In some embodiments of the present embodiments, the first region R1 and the second region R2 may have their own reflective patterns, and the reflective patterns of the first region R1 and the second region R2 may be irrelevant to each other.

In some embodiment, the light-guiding component 150 has the form of a cube. The first splitting interface 152 and the second splitting interface 154 may be formed by two crystals, in which one of the crystals has a V-shaped recess, and another crystal (e.g. prism) has a V-shaped protrusion. The V-shaped recess is bonded with the V-shaped protrusion, thereby forming two interfaces which are not parallel with each other. Plural transparent medium films (not shown) are coated at the interfaces, so as to form the first splitting interface 152 and the second splitting interface 154. In some embodiments of the present invention, the first splitting interface 152 is not parallel with the second splitting interface 154. In some embodiments, the first splitting interface 152 has −45 degrees with respect to an optic axis of the system, and the second splitting interface 154 has 45 degrees with respect to the optic axis of the system. Of course, it should not limit the scope of the present invention, in other embodiments, the first splitting interface 152 and the second splitting interface 154 may have other angles with respect to the optic axis of the system, and can send light to subsequent optical elements.

Figure 4:
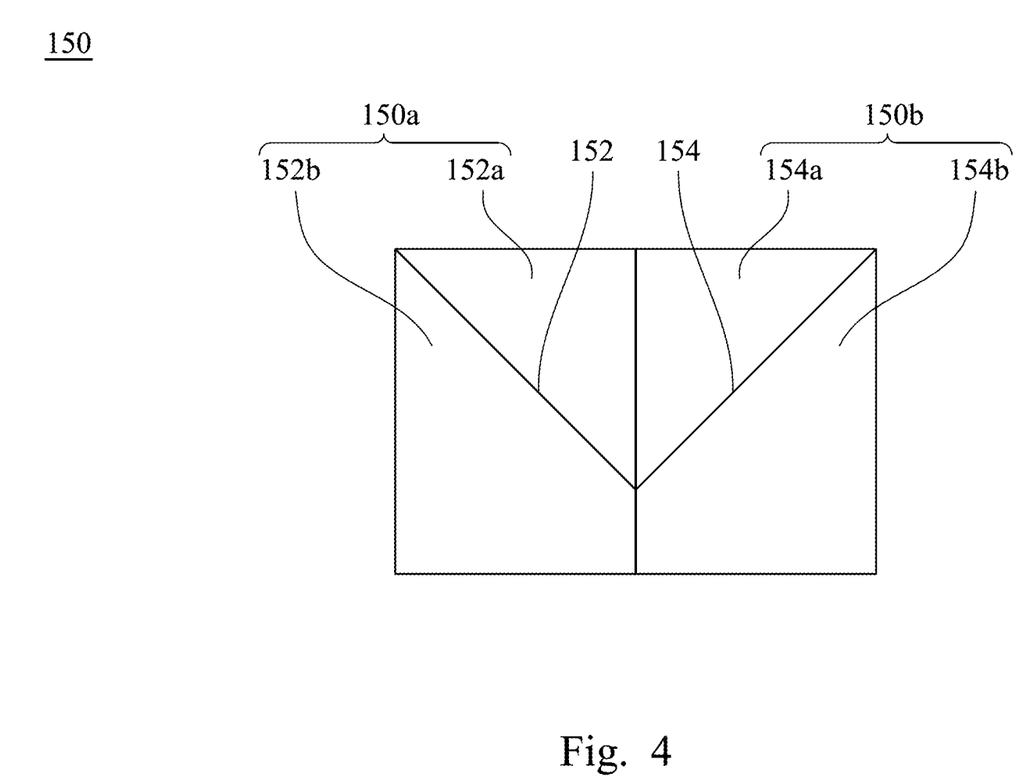
FIG. 4 is a top schematic view of part of elements of a near-eye display device according to some embodiments of the present invention.

The light-guiding component 150 may have other kinds of configuration. For example, reference is made to FIG. 4. FIG. 4 is a top schematic view of part of elements of a near-eye display device 100 according to some embodiments of the present invention. The difference between the present embodiment and the embodiment of FIG. 1 is that: the light-guiding component 150 may include a first beam splitter 150a and a second beam splitter 150b. In some embodiments of the present invention, the first beam splitter 150a and the second beam splitter 150b may have forms of cube. The first beam splitter 150a may be formed by two prisms 152a and 152b, in which plural transparent medium films (not shown) are coating on the adjoining interface of the prisms 152a and 152b, thereby forming the first splitting interface 152. The second beam splitter 150b may be formed by two prisms 154a and 154b, in which plural transparent medium films (not shown) are coating on the adjoining interface of the prisms 154a and 154b, thereby forming the second splitting interface 154.

In some embodiments, one of the prisms of the first beam splitter 150a is connected with one of the prisms of the second beam splitter 150b. In some embodiments, adhesives may be disposed between the first beam splitter 150a and the second beam splitter 150b, so as to fix the first beam splitter 150a and the second beam splitter 150b. In other embodiments, the first beam splitter 150a and the second beam splitter 150b may have a suitable gap therebetween. That is, the first beam splitter 150a and the second beam splitter 150b may be separated from each other.

In other embodiments, though it is not shown, the first beam splitter 150a and the second beam splitter 150b may be planar-type polarization beam splitters. That is, plural transparent medium films (not shown) are coating on transparent substrates or thin lens, thereby forming the first splitting interface 152 and the second splitting interface 154.

Reference is made to FIG. 1 and FIG. 2. In other embodiments, the coded-aperture module 130 may not be LCOS. To be specific, in the structure of the coded-aperture module 130, the substrate 132 may be transparent, and the pixels 134 may include active device (not shown), at least one electrode layer (not shown), and liquid crystal layer (not shown). There may be some polarizers designed in accordance with the pixels 134, so that the pixels 134 may control the transmittance. In other words, the coded-aperture module 130 may control the transmissive pattern of light, while other light is absorbed by polarizers. Herein, the coded-aperture module 130 is disposed between the light-guiding component 150 and the first lens group 122, and the light-guiding component 150 may include two reflective mirrors, so as to reflect the first portion of the light of the image coming from the first region R1 to the second lens group 124, and reflect the second portion of the light of the image coming from the second region R2 to the third lens group 126. Through the configuration, the light-guiding component 150 may also send the information having the left-eye image and the information having the right-eye image to different directions respectively.

In some embodiments of the present invention, the near-eye display device 100 may further include polarizing beam splitters 182 and 184, quarter-wave plates 186 and 188, and reflective mirrors 192 and 194. The reflective mirrors 192 and 194 are configured to receive light coming from the object lens group 120. Herein, the reflective mirrors 192 and 194 may be concave mirrors. The object lens group 120 is capable of focusing the light of the image coming from the first region R1 and the second region R2 onto the reflective mirrors 192 and 194 respectively, thereby forming the left-eye image and the right-eye image on the reflective mirrors 192 and 194 respectively. The polarizing beam splitters 182 and 184 may be disposed on the exit paths of second lens group 124 and the third lens group 126 of the object lens group 120 respectively. Herein, the polarizing beam splitter 182 and the quarter-wave plate 186 are disposed on the optic axis of the reflective mirror 192, and the polarizing beam splitter 182 is disposed on the optic axes of the first eyepiece group 142 and the second lens group 124. In some embodiments, the polarizing beam splitter 182 is disposed between the reflective mirror 192 and the first eyepiece group 142. Similarly, the polarizing beam splitter 184 and the quarter-wave plate 188 are disposed on the optic axis of the reflective mirror 194, and the polarizing beam splitter 184 is disposed on the optic axes of the second eyepiece group 144 and the third lens group 126. In some embodiments, the polarizing beam splitter 184 is disposed between the reflective mirror 194 and the second eyepiece group 144.

Herein, in FIG. 1 and FIG. 2, the polarizing beam splitters 182 and 184 are planar-type polarization beam splitters, and the light-guiding component 150 is a polarizing beam splitter cube. Of course, it should not limit the scope of the present invention, and in other embodiments, the polarizing beam splitters 182 and 184 may be polarizing beam splitter cubes.

In some embodiments of the present invention, the second lens group 124 and the third lens group 126 are respectively disposed on two opposite sides of the light-guiding component 150, so that the polarizing beam splitters 182 and 184, the quarter-wave plate 186 and 188, the reflective mirrors 192 and 194, and the first and second eyepiece group 142 and 144 are also respectively disposed on the two opposite sides of the light-guiding component 150. When the near-eye display device 100 is worn, eyes of a user is corresponding to the first position P1 and the second position P2 respectively, so that the image output module 110, the object lens group 120, the coded-aperture module 130, and the light-guiding component 150 are located at a region approximately above of a center of two eyes, such as the region from the forehead to the top of the head. As such, the weight of the image output module 110 is located at a region approximately above of a center of two eyes, such as the region from the forehead to the top of the head, and the user may wear the near-eye display device 100 firmly.

In actual manipulation, the image output module 110 provides N images in a time sequence, the first region R1 of the coded-aperture module 130 provides N first coded patterns in the same time sequence, and the second region R2 of the coded-aperture module 130 time-sequentially provides N first coded patterns in the same time sequence. Through the configuration, N left-eye images are sequentially formed on the reflective mirror 192, and N right-eye images are sequentially formed on the reflective mirror 194. N is a positive integer, and ideally N is at least two. Owing to the persistence of vision, the N left-eye images passing through the first eyepiece group 142 forms a light-field, which the left eye may view, and the N right-eye images passing through the second eyepiece group 144 forms another light-field, which the right eye may view. As such, the left and right eyes view different light-fields respectively, so that the user may experience the stereoscopic display effect with better depth of field.

Herein, the N images provided by the image output module 110 are actually N sub-images of a complete image. By processing the N sub-images in accordance with the coded-aperture module 130, the complete image may be transformed into the light field, thereby providing the stereoscopic display effect with better depth of field. Plural complete images may be sequentially provided, thereby achieving dynamic display effect. For example, the complete images may be output at a frequency of 60 hertz, and the N sub-images may be output at a frequency of 60*N hertz, so that the persistence of vision works.

In some embodiments of the present invention, the image output module 110 includes plural arrayed micro light-emitting diodes, and switching the micro light-emitting diodes on or off achieves the goal of providing image, in which the provided image is just like an image provided by a combination of a backlight and a display control panel (e.g., a liquid crystal panel). In some embodiments, the image output module 110 may include plural arrayed micro organic light-emitting diodes. In some embodiments, the image output module 110 may include a backlight and another LCOS, in which the LCOS may control reflective patterns, thereby forming the images. Of course, in some embodiments, the image output module 110 may also include a backlight and a display control panel (e.g., a liquid crystal panel), so as to provide images.

In some embodiments of the present invention, the image output module 110 may provide an image having the information of the left-eye image and the information of the right-eye image at the same time. In other embodiments, two adjacent image output modules may be used to respectively provide the information of the left-eye image and the information of the right-eye image at the same time, thereby achieving similar effects.

In some embodiments of the present invention, a near-eye display device is provided. The display method of time-multiplex is worked with different coded reflective pattern, so as to code the image, and the light of image passing the coded pattern is overlapped due to the persistence of version, thereby achieving the light field effect. Herein, by providing image having the information of the left-eye image and the information of the right-eye image at the same time, and extracting the information of the left-eye image and the information of the right-eye image by the light-guiding component, the brightness of the image is prevented from being lowered due to the time-multiplex of left and right eyes.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A near-eye display device, comprising:
an image output module configured to provide at least one image;
a coded-aperture module configured to encode light of the at least one image emitted from the image output module, so as to generate at least one left-eye image through a first portion of the coded-aperture module and at least one right-eye image through a second portion of the coded-aperture module;
a light-guiding component configured to send the left-eye image and the right-eye image to different directions respectively, wherein the light-guiding component comprises:

a first splitting interface corresponding to the first portion of the coded-aperture module; and a second splitting interface corresponding to the second portion of the coded-aperture module, wherein the first splitting interface is not parallel with the second splitting interface, at least one lens group disposed in at least one exit path of the light-guiding component; and at least one polarizing beam splitter disposed in at least one exit path of the lens group.

2. The near-eye display device of claim 1, wherein the light-guiding component is configured to send the left-eye image and the right-eye image to two opposite directions respectively.

3. The near-eye display device of claim 1, wherein the light-guiding component comprises at least one beam splitter.

4. The near-eye display device of claim 1, wherein the image output module comprises a plurality of light-emitting diodes.

5. The near-eye display device of claim 1, wherein the coded-aperture module is a liquid crystal on silicon (LCOS).

6. The near-eye display device of claim 1, further comprising:

at least one reflective mirror; and at least one eyepiece group, wherein the polarizing beam splitter is disposed between the reflective mirror and the eyepiece group.

7. The near-eye display device of claim 6, wherein the reflective mirror is a concave mirror.

8. The near-eye display device of claim 1, wherein two of the lens groups are disposed on two opposite sides of the light-guiding component.

9. The near-eye display device of claim 1, further comprising:

a polarizer configured to transform the light of the image to polarized light, and send the polarized light to the coded-aperture module.

10. The near-eye display device of claim 1, wherein the light-guiding component comprises:

a first beam splitter; and a second beam splitter, wherein the first beam splitter is structurally connected with the second beam splitter.

* * * * *